United States Patent
Kurachi et al.

(10) Patent No.: US 6,467,130 B2
(45) Date of Patent: Oct. 22, 2002

(54) DAMPING STRUCTURE FOR ROTATING MEMBER AND ASSIST GRIP INCLUDING THE DAMPING STRUCTURE

(75) Inventors: Katsuhito Kurachi, Nisshin (JP); Akihiko Hirose, Zama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/917,778

(22) Filed: Jul. 31, 2001

(65) Prior Publication Data

US 2002/0020042 A1 Feb. 21, 2002

(30) Foreign Application Priority Data

Aug. 10, 2000 (JP) ........................................ 2000-243214

(51) Int. Cl.⁷ ............................ A45C 13/22; A45C 13/26
(52) U.S. Cl. ........................... 16/438; 16/418; 16/445; 296/214; 188/83
(58) Field of Search ..................... 16/438, 418, 445; 296/214, 97.9; 188/83, 279, 290

(56) References Cited

U.S. PATENT DOCUMENTS

| | | | |
|---|---|---|---|
| 2,254,506 A | * 9/1941 | Whear, Jr. ........... | 16/409 |
| 3,204,286 A | * 9/1965 | Hillenbrand ......... | 16/439 |
| 4,694,530 A | * 9/1987 | Foggini ............... | 16/82 |
| 4,842,106 A | * 6/1989 | Ludwig et al. ...... | 16/222 |
| 4,893,522 A | * 1/1990 | Arakawa .............. | 16/82 |
| 4,981,322 A | * 1/1991 | Dowd et al. .......... | 24/297 |
| 4,981,323 A | * 1/1991 | Dowd et al. .......... | 105/354 |
| 5,403,064 A | * 4/1995 | Mahler et al. ....... | 105/354 |
| 5,497,863 A |   3/1996 | Schmidt et al. | |
| 5,920,957 A | * 7/1999 | Wagner ............... | 16/408 |
| 6,076,233 A | * 6/2000 | Sasaki et al. ........ | 16/438 |
| 6,223,395 B1 | * 5/2001 | Miho et al. .......... | 16/429 |
| 6,397,435 B1 | * 6/2002 | Gosselet ............. | 16/438 |
| 6,397,436 B1 | * 6/2002 | Wang ................... | 16/114.1 |

FOREIGN PATENT DOCUMENTS

| | | | |
|---|---|---|---|
| DE | 29707759 | * | 7/1997 |
| DE | 196 11 309 | | 2/1998 |
| EP | 0 356 919 | | 3/1990 |
| EP | 0 875 420 | | 11/1998 |
| EP | 0 900 691 | | 3/1999 |
| FR | 2606846 | * | 10/1986 |
| JP | UM7-18967 | | 4/1995 |
| JP | 9-263166 | | 10/1997 |

* cited by examiner

*Primary Examiner*—Robert E. Pezzuto
*Assistant Examiner*—Thomas A. Beach
(74) *Attorney, Agent, or Firm*—Kanesaka & Takeuchi

(57) ABSTRACT

A damping structure is formed of a base including at least one projecting portion having a shaft or a hole, and a first engaging portion; a rotating member including a first wall portion having the other of the hole or the shaft engaging the shaft or hole, a second wall portion facing the first wall portion to receive the projection therebetween so that when the first wall portion is supported by the projecting portion, a space is formed between the projecting portion and the second wall portion, and a second engaging portion; and a damper disposed in the space. The damper includes an inner shaft having a third engaging portion engaging the first or second engaging portion, and an outer shaft rotatably situated around the inner shaft to generate a damping force against a rotation of the inner shaft. The outer shaft has a fourth engaging portion engaging the first or second engaging portion to thereby provide a damping force to the rotating member.

7 Claims, 7 Drawing Sheets

DAMPING STRUCTURE FOR ROTATING MEMBER AND ASSIST GRIP INCLUDING THE DAMPING STRUCTURE

BACKGROUND OF THE INVENTION AND RELATED ART STATEMENT

The present invention relates to a damping structure for a rotating member, and especially, it relates to a damping structure for a rotating member used in an assist grip of an automobile.

As a movable or swingable type assist grip installed in an automobile, there has been known an assist grip provided with urging means, such as a spring, for returning the assist grip from a use position to a stored position, and a damper for damping or applying a brake on the assist grip which swings in a returning direction by an urging force of the urging means. As an example, there can be exemplified an assist grip disclosed in Japanese Patent Publication (KOKAI) No. H9-263166. FIG. 9 shows a support section at a side to which a damper of an assist grip disclosed in Japanese Patent Publication (KOKAI) No. H9-263166 is attached, which will be explained hereunder.

As shown in the figure, in one of support sections of an assist grip 100, a grip member 104 is attached to a base member 102 fixed on a wall, such as a ceiling section of an interior of an automobile, through a damper 106.

The damper 106 is formed of an outer cylinder 108 made of resin and an inner shaft 110 made of metal. In the outer cylinder 108, a small diameter portion 112 at a distal end side of an inserting direction is inserted into a small diameter coaxial hole 114 of the base member 102, and a knurl portion 118 formed on an outer peripheral surface of a large diameter portion 116 at a base end side of the inserting direction is fixed, not to rotate, to a hole wall of a large diameter coaxial hole 120 of the base member 102.

In the inner shaft 110 rotatably inserted inside the outer cylinder 108, a small diameter portion 122 at the distal end side of the inserting direction is inserted and fitted into a small diameter coaxial hole 124 of the grip member 104, and a knurl portion 126 at the base end side of the inserting direction is fixed, not to rotate, to a hole of a large diameter coaxial hole 128 of the grip member 104.

Then, a space formed between a large diameter portion 130 of the inner shaft 110 and a housing hole 132 of the outer cylinder 108 is filled with damper oil, and seal rings 136 are respectively fitted into a pair of seal ring grooves 134 formed at both end portions in the axial direction of the large diameter portion 130 such that the space is sealed.

On the other hand, in the other supporting section of the assist grip 100, which is not shown in the figure, urging means is installed, and the urging means constantly urges the assist grip to a wall surface side (stored position).

Accordingly, in the assist grip 100 which is returned from the use position to the stored position by the urging force of the urging means, a returning speed thereof is suppressed due to viscous resistance by oil in the damper 106, so as to prevent the assist grip from colliding with the wall surface at high speed.

However, in the conventional assist grip as described above, the assembly of the damper is carried out together with the assembly of a rotating shaft. Namely, while the grip member 104 is positioned at the base member 102, the inner shaft 110 is inserted into the outer cylinder 108 from the axial direction to form the damper 106, and at the same time, the small diameter portion 122 at the distal end of the inner shaft 110 is positioned at the small diameter coaxial hole 124 of the grip member 104 to be inserted thereinto. Therefore, a working ability in assembly is poor.

Also, since the grip member 104 is axially supported at the base member 102 through the damper 106 having a damping function, a force or load applied to the grip member 104 naturally acts on the damper 106 as well. Thus, there are problems of giving harmful effects on damping and durability, such that the frictional resistance at the slide contact portions 138A, 138B and 138C, where the inner shaft 110 contacts the outer cylinder 108, is increased to change the damping force, or the entire damper 106 may be bent to cause oil leakage.

The present invention has been made in view of the foregoing, and an object of the invention is to provide a damping structure of a rotating member and an assist grip provided with the damping structure of the rotating member, in which a workability in assembly is improved and the rotating member is excellent in durability while damping of the rotating member is normally carried out.

Further objects and advantages of the invention will be apparent from the following description of the invention.

SUMMARY OF THE INVENTION

To achieve the above object, a damping structure of a rotating member according to a first aspect of the invention is formed of a base, which includes a plurality of projecting portions arranged at predetermined intervals and each having shafts projecting in the same direction and coaxially disposed or holes opening in the same direction and coaxially disposed; a rotating member, which has a plurality of wall portions corresponding to the projecting portions and each having inserting holes fitted around the shafts or inserting shafts inserted into the holes so that the rotating member is axially supported by the base to be freely rotatable, in which the rotating member in an axially supported condition and one of the projecting portions adjacent to one of the wall portions form a space therebetween; and a damper, which includes an inner shaft and an outer cylinder. The damper has side surfaces stored in the space, and the side surfaces of the damper respectively abut against the projecting portion and the wall portion. The inner shaft includes an engaging portion engaging an engaging portion provided in the projecting portion, and is disposed coaxially to the shafts or the holes. The outer cylinder is attached rotatably around the inner shaft and generates a damping force against a rotation relative to the inner shaft. The outer cylinder has an engaging portion engaging an engaging portion provided in the rotating member.

In the damping structure of the rotating member according to the first aspect of the invention, a rotation of the rotating member free rotatably supported by the base is damped due to a damping force of the damper disposed between the base and the rotating member. The base is provided with a plurality of the projecting portions disposed at predetermined intervals, and the projecting portions are respectively provided with the shafts having the same projecting direction and arranged coaxially, or the holes having the same opening direction and disposed coaxially. The rotating member is provided with the plurality of wall portions corresponding to the plurality of the projecting portions, and the wall portions are respectively provided with the inserting holes or the inserting shafts, so that when the inserting holes are fitted around the shafts or the inserting shafts are inserted into the holes of the base from the predetermined direction, the axially supported condition described above is obtained.

Here, when the inserting holes are fitted around the shafts or the inserting shafts are inserted into the holes, a space is formed between the rotating member and the projecting portion adjacent to one of the plurality of wall portions. When the damper is stored in the space, the opposing side surfaces of the damper abut against the projecting portion and the wall portion, so that the rotating member is prevented from falling off from the base.

The damper is formed of the inner shaft and the outer cylinder rotatably attached around the inner shaft, and in the condition that the damper is stored in the space, a shaft center of the inner shaft is aligned with a shaft center of the shaft or the hole (inserting hole or inserting shaft). Also, the engaging portion of the inner shaft is engaged with the engaging portion provided in the projecting portion of the base, so that the inner shaft is fixed not to rotate to the base side, and the fourth engaging portion of the outer cylinder is engaged with the engaging portion provided in the rotating member so that the outer cylinder is rotated together with the rotating member.

Accordingly, when the rotating member is rotated, in accordance with the rotation thereof, the outer cylinder of the damper is relatively rotated with respect to the inner shaft, and the resistance force is caused between the inner shaft and the outer cylinder to thereby apply the brake on the rotating member. As the resistance force, for example, a mechanical frictional resistance, or viscous resistance of the viscous fluid, such as oil, filling a space between the inner shaft and the outer cylinder, can be utilized.

As described above, in the damping structure of the rotating member of the invention, the inserting holes or the inserting shafts of the rotating member are inserted around the shafts or into the holes of the base from the predetermined direction so as to axially support the rotating member, and while the damper is stored in the space formed between the projecting portion of the base and the wall portion of the rotating member in the axially supported condition, by merely engaging the respective engaging portions with each other, the assembly is completed. Therefore, as compared with the conventional damping structure, there are no complicated steps of assembling the damper together with inserting the rotational shaft, so that the assembly is simplified. Further, since the damper can be assembled by itself, replacement of the damper can be made easily.

Also, in the use condition such that the load in the diametral direction is applied to the rotating member as in the assist grip, since the force applied to the rotating member is supported by the base through the axial support section (fitting portion between the shaft and the inserting hole or between the hole and the inserting shaft), the force does not directly act on the damper. Thus, the change in the damping force is prevented, and the durability of the damper is improved.

A damping structure of a rotating member according to a second aspect of the invention is formed of a base provided with a projecting portion, which has a shaft or a hole; a rotating member having a first wall portion, which includes an inserting hole inserted by the shaft or an inserting shaft inserted into the hole and is free rotatably supported at the projecting portion of the base, and a second wall portion opposed to the first wall portion and disposed at a forward side in a direction of inserting the inserting hole or inserting shaft, in which the second wall portion in an axially supported condition and the projecting portion form a space therebetween; and a damper having an inner shaft and an outer shaft. The damper is stored in the space, and side surfaces opposed to each other of the damper abut against the projecting portion and the second wall portion. The inner shaft is disposed coaxially to the shaft or the hole, and has an engaging portion engaging an engaging portion provided in the projecting portion. The outer cylinder is rotatably attached around the inner shaft and generates a damping force against a rotation relative to the inner shaft. The outer cylinder has an engaging portion engaging an engaging portion provided in the rotating member.

In the damping structure according to the second aspect of the invention, the base is provided with the projecting portion, and the shaft or the hole is provided in the projecting portion. The rotating member is provided with the first wall portion corresponding to the projecting portion, and the inserting hole or the inserting shaft is formed in the first wall portion, so that when the inserting hole is fitted around the shaft at the base side or the inserting shaft is inserted into the hole at the base side, the axially supported condition described above is obtained. Further, in the rotating member, the second wall portion opposed to the first wall portion is disposed at a forward side of the inserting direction, and when the rotating member is axially supported by the base, the space is formed between the second wall portion and the projecting portion. When the damper is stored in the space, as in the damping structure according to the first aspect of the invention, the opposing side surfaces of the damper abut against the projecting portion and the wall portion, so that the rotating member is prevented from falling off from the base.

As in the first aspect of the invention, the structure of the damper is formed of the inner shaft and the outer cylinder rotatably attached around the inner shaft. In the condition that the damper is stored in the space, a shaft center of the inner shaft is aligned with a shaft center of the shaft or the hole (inserting hole or inserting shaft). Also, the engaging portion of the inner shaft is engaged with the engaging portion formed in the projecting portion of the base so that the inner shaft is stopped at the base side so as not to rotate, and the engaging portion of the outer cylinder is engaged with the engaging portion provided in the rotating member, so that the outer cylinder is rotated together with the rotating member.

Thus, the outer cylinder of the damper is rotated due to the rotation of the rotating member, and the resistance force is caused between the outer cylinder and the inner shaft, to thereby apply the brake on the rotating member. Also here, as the resistant force, the mechanical frictional resistance or the viscous resistance of the viscous fluid can be utilized.

Therefore, also in this damping structure of the rotating member, the inserting hole or the inserting shaft of the rotating member is fitted around the shaft or inserted into the hole of the base from the predetermined direction to axially support the rotating member, and while the damper is stored in the space between the projecting portion of the base and the second wall portion of the rotating member, by merely engaging the respective engaging portions with each other, the assembly is completed. Therefore, the assembly can be made easily.

Also, even in the embodiment that the load in the diametral direction is applied to the rotating member, as in the damping structure of the first aspect of the invention, the force applied to the rotating member is supported by the axial support section between the rotating member and the base so that the force does not act on the damper. Therefore, a change in the damping force or the deterioration in the durability can be prevented.

According to a third aspect of the invention, the damping structure of the rotating member according to the first aspect or the second aspect of the invention further includes holding means for holding the damper stored in the space.

In the damping structure according to the third aspect of the invention, since the damper is held by the holding means, the damper is prevented from disengaging from the storage space (base and the rotating member), so that falling off due to the vibration or impact can be prevented.

According to a fourth aspect of the invention, in the damping structure of the rotating member according to the third aspect of the invention, the holding means is formed of an elastic member, which is integrally formed with the base to be elastically deformable, and the elastic member supports the outer cylinder of the damper.

In the damping structure according to the fourth aspect of the invention, by forming the holding means by the elastically deformable elastic member formed integrally with the base, the structure thereof can be simplified, and manufactured at low cost. Also, since the damping structure of the invention does not have a tightening structure, such as screw, or a mechanical fixing structure, the assembly of the damper can be easily carried out.

According to a fifth aspect of the invention, the damping structure according to any of the first through fourth aspects of the invention can be applied to an assist grip.

DETAILED DESCRIPTION OF PREFERRED EMBODIMENTS

Hereunder, embodiments of the invention will be explained with reference to the attached drawings.

Figure 1:
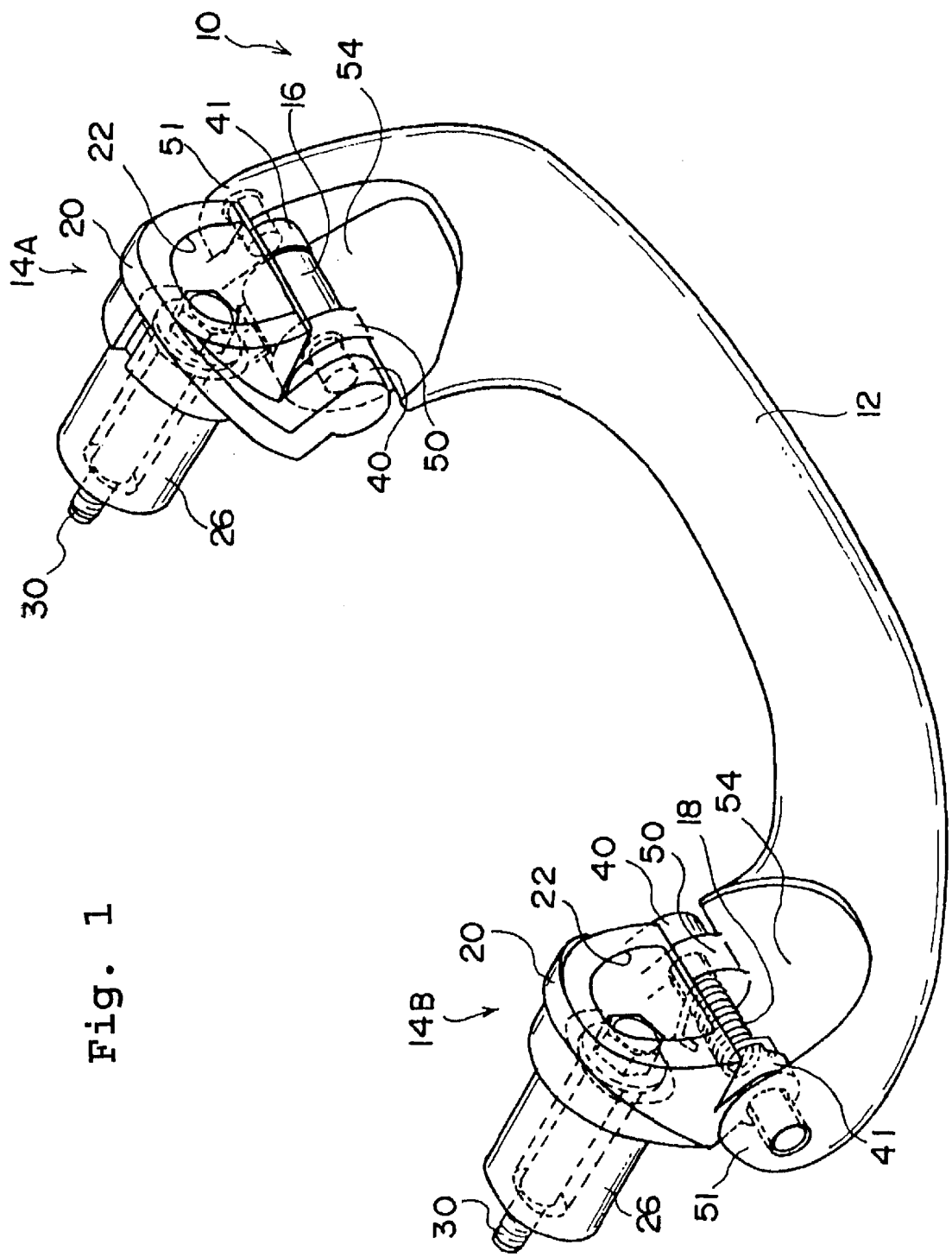
FIG. 1 is a perspective view showing an assist grip in which a damping structure of a rotating member according to an embodiment of the invention is applied.
Figure 2:
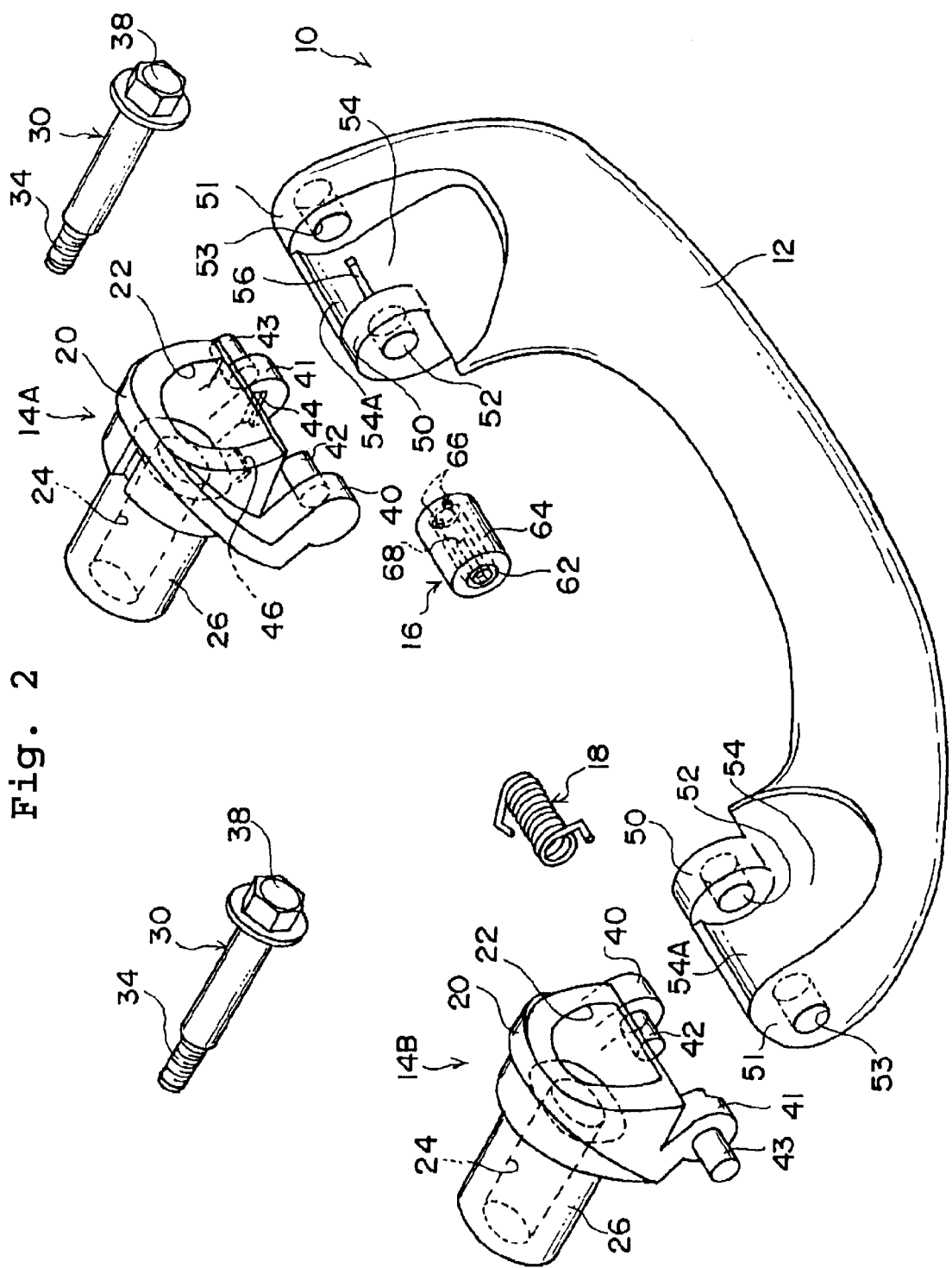
FIG. 2 is an exploded perspective view of the assist grip shown in FIG. 1.

FIG. 1 and FIG. 2 show an assist grip according to an embodiment of the invention, wherein FIG. 1 is a perspective view of the assist grip at a use position, and FIG. 2 is an exploded perspective view thereof. The assist grip 10 includes a substantially U-shaped grip main body 12 as a gripping section, and retainers 14A and 14B, which are respectively disposed at both end portions of the grip main body 12 to be attached to the ceiling section or wall of the interior of the vehicle and axially support the grip main body 12 to allow the grip main body 12 to be capable of swinging.

In the retainer 14A located at a right side in the figure, an oil damper 16 is assembled, and in the retainer 14B disposed at a left side in the figure, a spring 18 as urging means is attached. Hereunder, a structure of the assist grip 10 provided with the oil damper 16 and the spring 18 or the like will be explained in detail.

The retainer 14A is made of resin, and includes a main body section 20 in a substantially trapezoidal shape as shown in the figure. On a front surface side of the main body section 20, there is formed a concave portion 22 having an opening shape substantially similar to an outline of the main body section 20, and an elongated hole 24 is bored at a center of a bottom surface of the concave portion 22.

Figure 3:
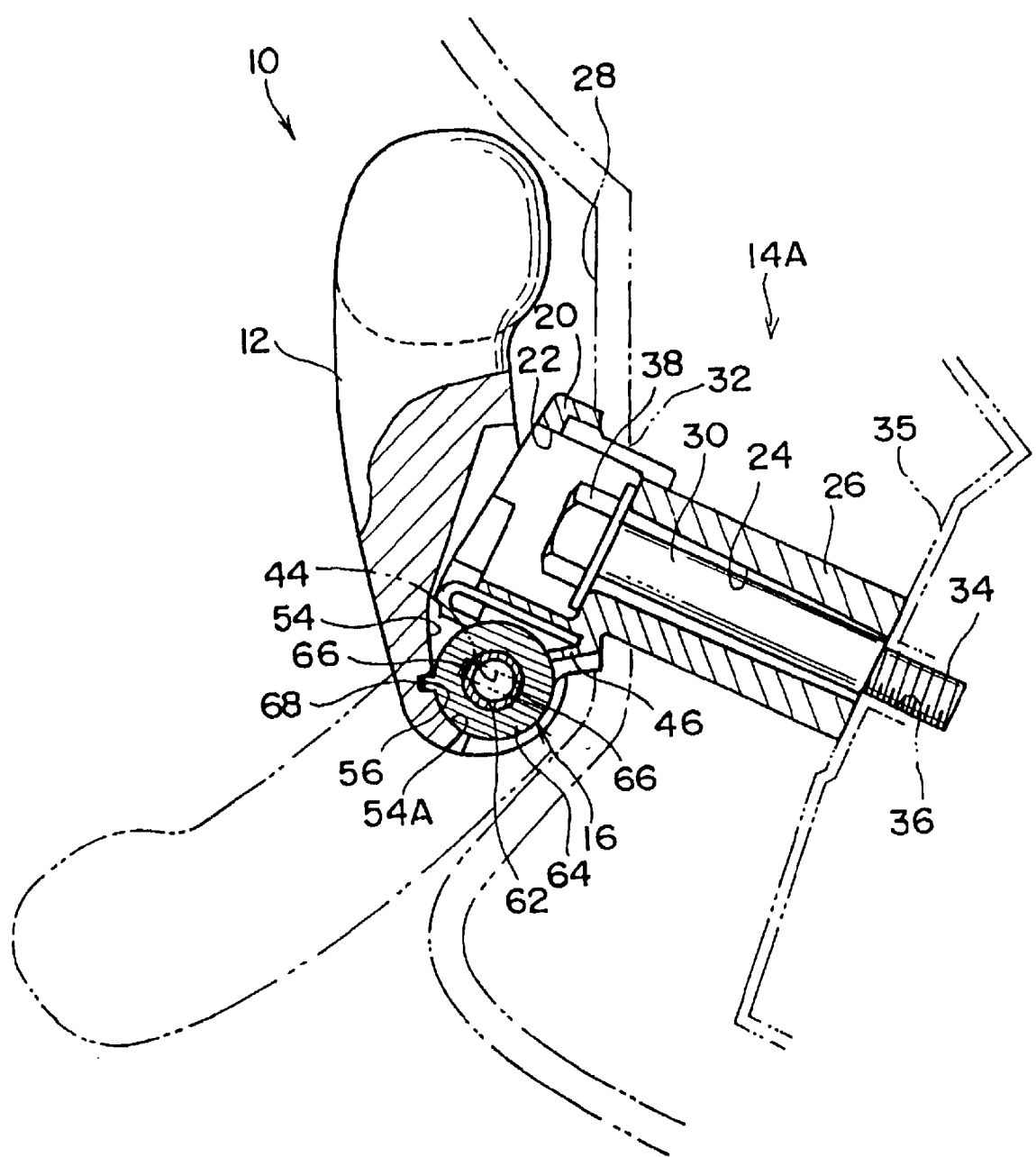
FIG. 3 is a side sectional view of a retainer at a side with an oil damper in a condition that the assist grip of FIG. 1 is attached to a ceiling section of an interior of a vehicle, wherein a stored position is shown.
Figure 4:
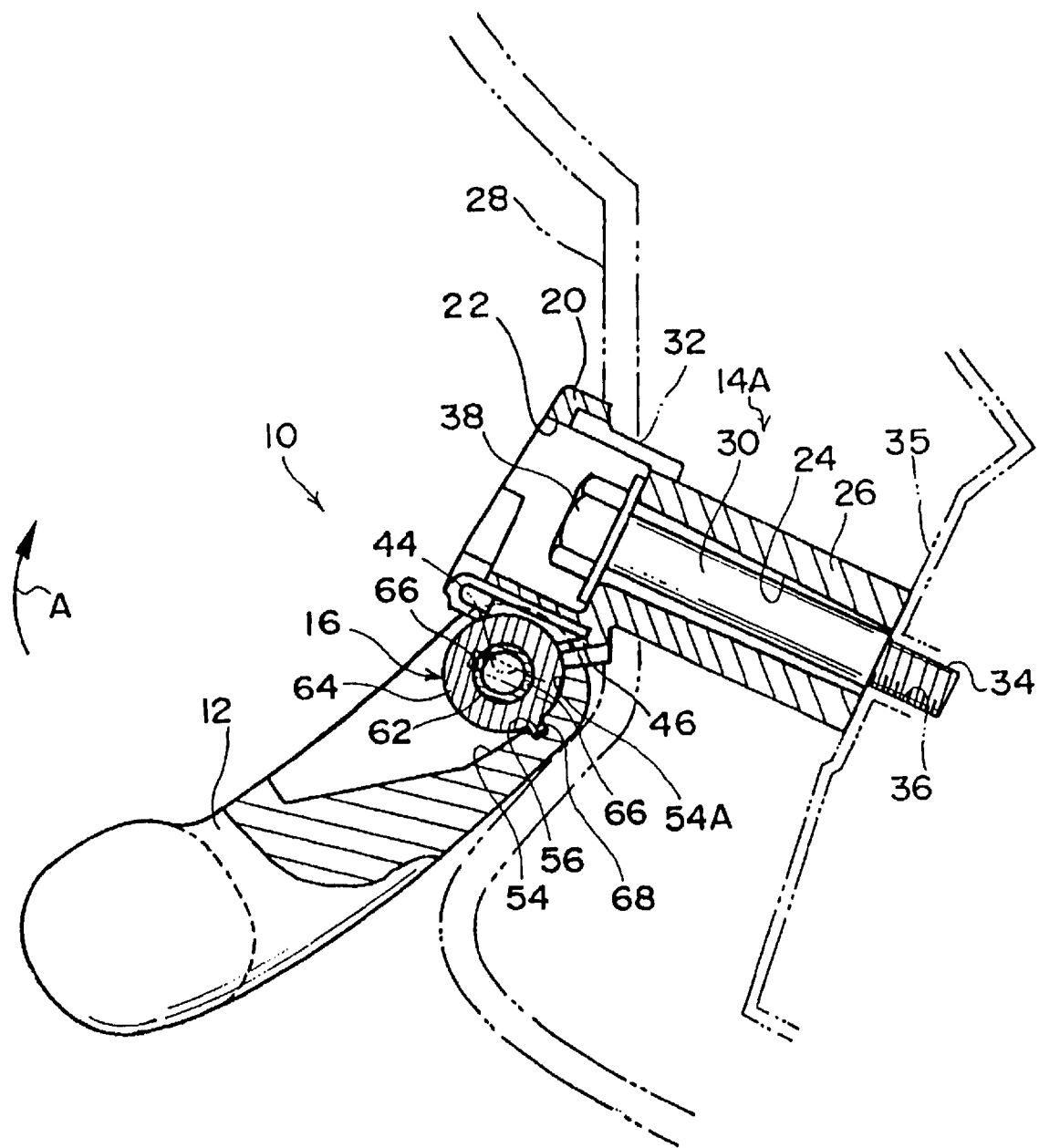
FIG. 4 is a side sectional view of the retainer, in a use portion, at a side with the oil damper in the condition that the assist grip of FIG. 1 is attached to the ceiling section of the interior of the vehicle.

A longitudinal direction of an inner diameter of the elongated hole 24 is aligned with a width direction of the main body section 20, and the elongated hole 24 is bored through the main body section 20 and a cylinder section 26 projected at an approximately center of a rear surface of the main body section 20. As shown in FIG. 3 and FIG. 4, a bolt 30 for fixing the retainer 14A to a wall 28 is inserted into the elongated hole 24.

In the retainer 14A, as shown in the figures, in the condition that the cylinder section 26 and a part of the main body section 20 are inserted into a mounting hole 32 of the wall 28, the bolt 30 is inserted into the elongated hole 24, and a thread portion 34 at the distal end side of the bolt 30 is engaged with a threaded hole 36 of a body 35 to be attached. A head 38 of the bolt 30 is held in the concave portion 22 described above so as not to project to the front surface side of the main body section 20. Incidentally, a cover, not shown, is put on the front surface of the main body 20, so that the head 38 of the bolt 30 is covered and hidden.

A pair of projecting portions 40 and 41 having substantially disc-shaped distal ends extending like an arm projects downwardly from both side surfaces of the main body section 20. The projecting portions 40 and 41 are disposed at a predetermined interval therebetween to be opposed to each other, and shafts 42 and 43 coaxially disposed and having the same diameter project outwardly (a right direction in the figure) from about centers of the respective side surfaces (outer surfaces) of the projecting portions 40 and 41. Also, a groove 44 parallel to the projecting direction of the cylinder section 26 is formed at the other side surface (inner surface) of the projecting portion 41 located outside.

Furthermore, at a lower surface side of the main body section 20, from the vicinity of the base end of the cylinder section 26, a plate-like elastic piece 46, which has a predetermined thickness and is elastically deformable, projects toward a shaft center direction of the shafts 42 and 43 (refer to FIG. 3 and FIG. 4).

On the other hand, at the distal end portion on the one end side of the grip main body 12 assembled with the retainer 14A, there is formed a pair of wall portions 50 and 51 corresponding to the projecting portions 40 and 41 and facing each other with a predetermined interval therebetween. The wall portions 50 and 51 have contours or outer peripheries in substantially circular arc shapes, and coaxial through holes 52 and 53 are bored at about the centers of the wall surfaces. The through holes 52 and 53 have the diameters slightly larger than those of the shafts 42 and 43 at the retainer 14A side, and the through holes 52 and 53 are fitted log around the shafts 42 and 43 so that the one end side of the grip member 12 is axially supported by the retainer 14A to be capable of swinging.

Also, in a bottom wall 54 located between the wall portions 50 and 51, a wall surface 54A at a distal end side of the bottom wall 54 is bent along the contours of the wall portions 50 and 51, and an elongated groove 56 is formed at a position overlapping the axis of the through holes 52 and 53 to extend along the axial direction.

Figure 5:
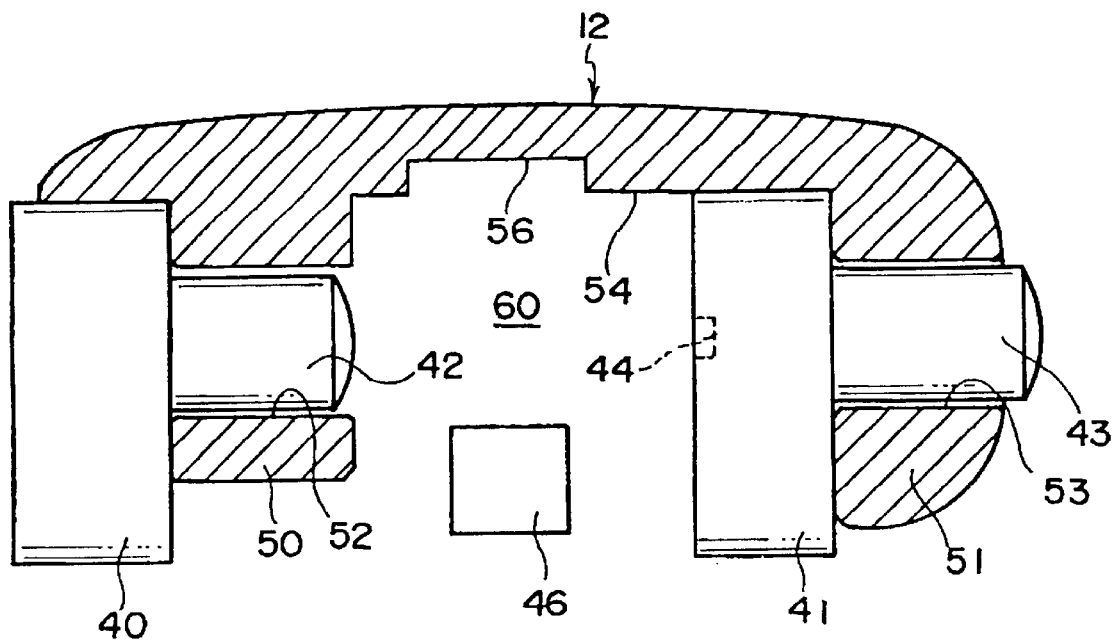
FIG. 5 is a schematic, partial sectional view showing a main portion of a grip main body when one end side of the grip main body is axially supported by the retainer at the stored position, wherein the oil damper is not assembled therewith.
Figure 6:
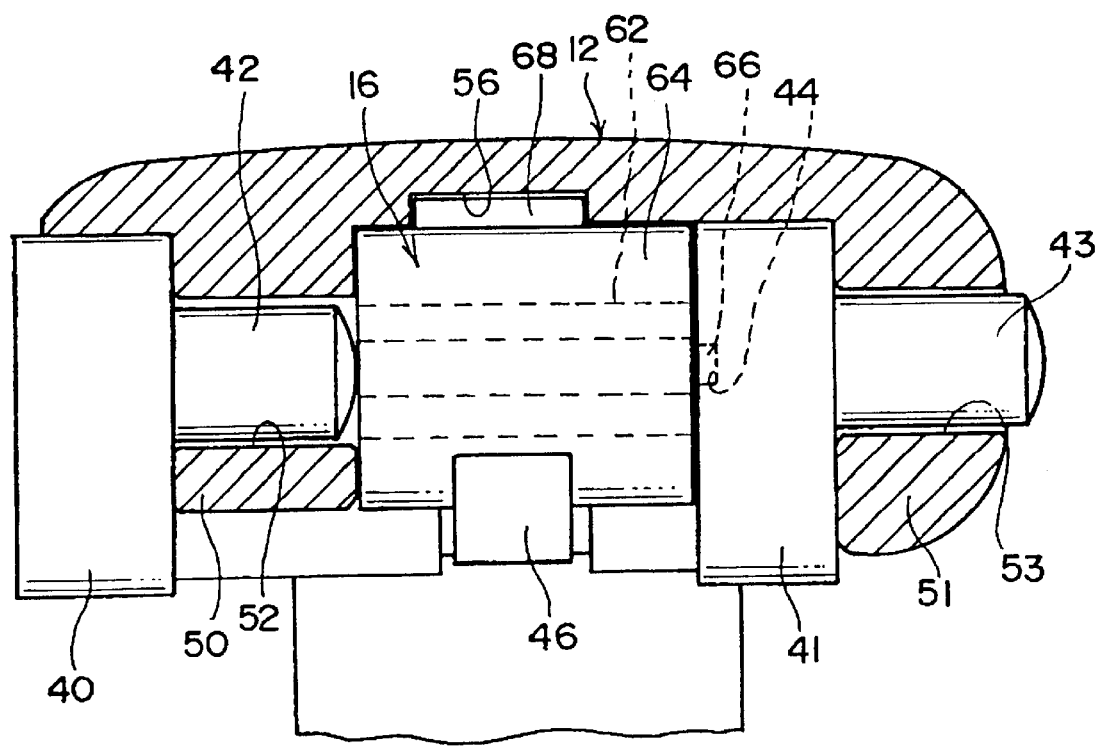
FIG. 6 is a schematic, partial sectional view showing the main portion of the grip main body when one end side of the grip is axially supported by the retainer at the stored position, wherein the oil damper is assembled therewith.

FIG. 5 and FIG. 6 are partly sectional views showing a condition that the one end side of the grip main body 12 is axially supported by the retainer 14A. As shown in FIG. 5, when the through holes 52 and 53 at the grip main body 12 side are fitted around the shafts 42 and 43 such that the wall portion 50 abuts against the projecting portion 40 and the wall portion 51 abuts against the projecting portion 41, there is formed a space 60 surrounded by the projecting portion 41, the wall portion 50 and the bottom wall 54 of the grip main body 12. In the invention, it is structured that the oil damper 16 is stored in the space 60 as shown in FIG. 6.

The oil damper 16 is made of resin, and formed of a cylindrical inner shaft 62, and an outer cylinder 64 enclosing the inner shaft 62 therein and rotatably attached around the inner shaft 62 (refer to FIG. 2). A space formed between the inner shaft 62 and the outer cylinder 64 is filled with oil, and when the outer cylinder 64 is rotated relative to the inner shaft 62, the damping force is formed by the viscous resistance of oil.

Also, on one end surface of the inner shaft 62, a pair of projections 66 is disposed at positions symmetrical to each other around the shaft center of the inner shaft 62, and an elongated projection 68 is formed on an outer peripheral surface of the outer cylinder 64 along the axial direction thereof.

The length of the oil damper 16 matches the width of the space 60, that is, the inner width between the projecting portion 41 and the wall portion 50. Therefore, in the condition that the oil damper 16 is stored in the space 60 as shown in FIG. 6 (FIG. 1), both side surfaces of the oil damper 16 abut against the projecting portion 41 and the wall portion 50 so that positioning of the oil damper 16 in the axial direction is made, and at the same time, the grip main body 12 is prevented from disengaging from the retainer 14A.

Also, in this stored condition, as shown in FIG. 3 and FIG. 4, a part of the outer peripheral surface of the outer cylinder 64 contacts the wall surface 54A of the bottom wall 54 of the grip main body 12, and the outer cylinder 64 is held by the elastic piece 46 disposed at the side opposite to the contacting portion. Accordingly, positioning of the oil damper 16 in the diametral direction is made, and the shaft center of the oil damper 16 (inner shaft 62) is aligned with the shaft centers of the shafts 42 and 43 and the through holes 52 and 53.

Furthermore, a pair of the projections 66 engages the groove 44 of the projecting portion 41 so that the inner shaft 62 is prevented from rotating by the retainer 14, and the elongated projection 68 of the outer cylinder 64 is engaged with the elongated groove 56 at the grip main body 12 side. Therefore, when the grip main body 12 swings or rotates, in accordance with the swinging, the outer cylinder 64 of the oil damper 16 is relatively rotated with respect to the inner shaft 62, so that the damper function is acted to apply a brake on the motion of the grip main body 12.

On the other hand, at the retainer 14B side, as shown in FIG. 2, the retainer 14B and the other end side of the grip main body 12 attached to the retainer 14B have shapes, which are laterally symmetrical to those of the retainer 14A and the one end side of the grip main body 12. Here, portions which have the same functions as those at the retainer 14A side are designated by the same references used in the explanation at the retainer 14A side, to thereby omit the explanations thereof.

In the embodiment of the invention, the spring 18 made of metal is attached to the space between the projecting portion 41 of the retainer 14B and the wall portion 50 at the other end side of the grip main body 12, and the spring 18 urges the grip main body 12 toward a storing direction shown in FIG. 3.

Figure 7:
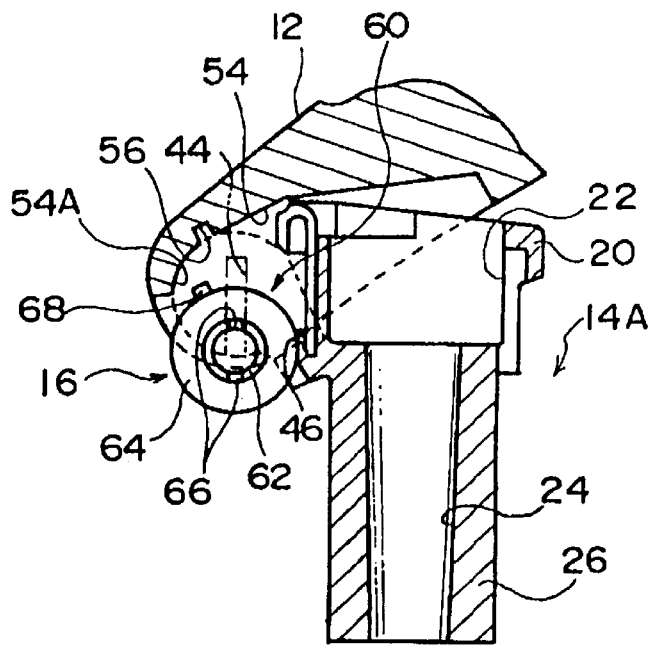
FIG. 7 is a side sectional view of the grip main body and the retainer in the condition that the oil damper is being assembled, for explaining the steps of assembling the oil damper.

Here, steps of attaching the oil damper 16 to the retainer 14A will be explained. Namely, after the through holes 52 and 53 at the grip main body 12 side are fitted around the shafts 42 and 43 at the retainer 14A side (refer to FIG. 5), as shown in FIG. 7, the bottom wall 54 of the grip main body 12 is rotated so as to get closer to the main body section 20 of the retainer 14A. Accordingly, an entrance for the space 60 formed between the retainer 14A and the grip main body 12 is widely opened, and it becomes possible to insert the oil damper 16 therein.

In case of inserting the oil damper 16 into the space 60, the elongate projection 68 of the outer cylinder 64 is positioned to a forward side of the inserting direction, and the projections 66 of the inner shaft 62 are fitted with the groove 44 at the retainer 14A side, and in this condition, the oil damper 16 is inserted. At this time, the outer peripheral surface of the outer cylinder 64 presses the elastic piece 46 at the retainer 14A side, and the elastic piece 46 is bent and deformed such that the elastic piece 46 is brought down to the main body section 20 side.

Figure 8:
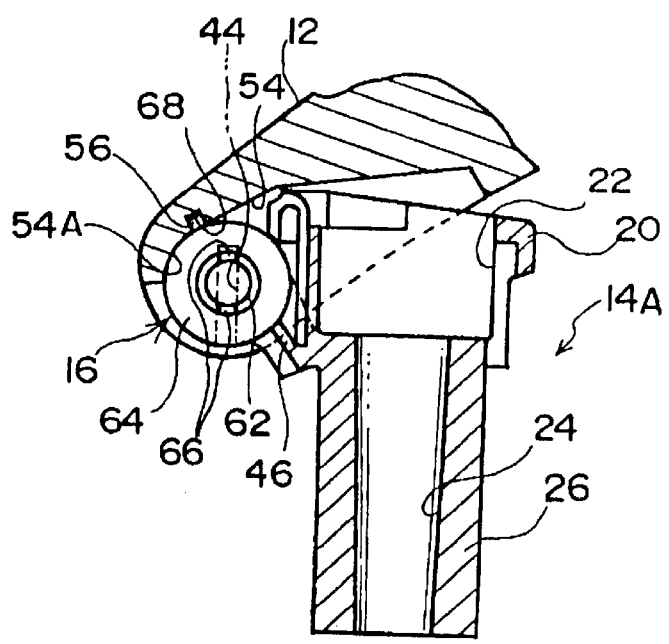
FIG. 8 is a side sectional view of the grip main body and the retainer in the condition that the oil damper is assembled, for explaining the steps of assembling the oil damper.
Figure 9:
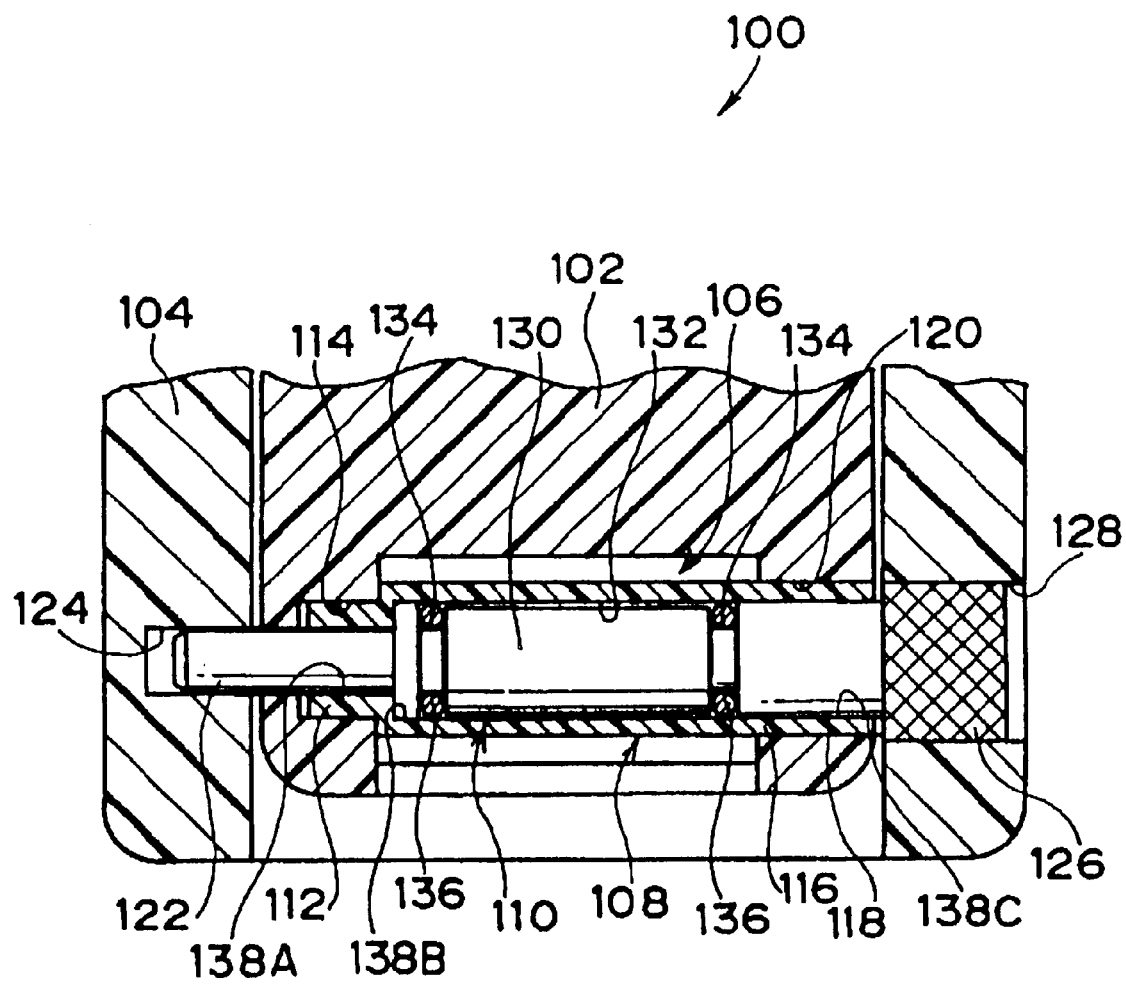
FIG. 9 is a schematic sectional view of a retainer at a side with an oil damper in a conventional assist grip.

The oil damper 16 is pushed into the space 60 as it is, and the elongated projection 68 is fitted with the elongated groove 56 at the grip main body 12 side. When the outer cylinder 64 contacts the wall surface 54A of the bottom wall 54 to be positioned, the elastic piece 46 is returned to its original form by the elastic force to thereby hold the outer cylinder 64, so that the oil damper 16 is assembled as shown in FIG. 8.

Next, the operation of the embodiment will be explained. Namely, when a hand of an operator is released from the grip main body 12 at the use position of the assist grip shown in FIG. 4, the grip main body 12 swings in a direction of an arrow A in the figure by the urging force of the spring 18, and the grip main body 12 returns to the stored position shown in FIG. 3. At this time, in the oil damper 16, the outer cylinder 64 is rotated around the inner shaft 62 fixed to the retainer 14A to thereby cause the damping force, so that the operation speed of the grip main body 12 connected to the outer cylinder 64 is reduced.

Also, the oil damper 16 is attached between the retainer 14A and the grip main body 12 without having rotational shafts or the like therebetween, and the load applied to the grip main body 12 is supported by the retainer 14A through the shafts 42 and 43 inserted into the through holes 52 and 53. Thus, the load does not reach the oil damper 16. Accordingly, damping of the grip main body 12 can be carried out normally, and durability of the oil damper 16 is improved.

As described above, in the assist grip 10 according to the embodiment of the invention, the through holes 52 and 53 of the grip main body 12 are fitted around the shafts 42 and 43 of the retainer 14A from the predetermined direction to axially support the grip main body 12. In this condition, the oil damper 16 is being stored in the space 60, which is formed between the projecting portion 41 of the retainer 14A and the wall portion 50 of the grip main body 12, by merely engaging the projections 66 of the inner shaft 62 with the groove 44 and by engaging the elongated projection 68 of the outer cylinder 64 with the elongated groove 56, so that the assembly is completed. Therefore, the assembly is simplified.

Also, in case the present invention is applied to the assist grip 10 as in the embodiment, the load applied to the grip main body 12 does not directly acts on the oil damper 16, so that the normal damping force can be obtained for a long period of time.

Further, in the embodiment of the invention, since the oil damper 16 is held by the elastic piece 46 of the retainer 14A, even if the vibration or the impact is applied to the oil damper, the oil damper is not easily disengaged. Also, since the elastic piece 46 is integrally formed with the retainer 14A, the structure thereof is simple and can be manufactured at a low cost. Also, the assembly of the oil damper 16 can be made easily.

Incidentally, although the shafts 42 and 43 are formed at the retainer side and the through holes 52 and 53 are formed at the grip main body side in the embodiment of the invention, the arrangement of those shafts and through holes can be switched. Also, the respective holes into which the shafts having the same projecting direction are inserted are not necessary to be the through holes. The opening directions may be aligned so that the shafts can be inserted into the holes from the same direction.

Also, the axial support portion by a combination of the shaft and hole is not limited to two places, and can be three places or more by increasing the projecting portions and wall portions, and even in case of a structure axially supporting at one place, the present invention can be applied. In the present embodiment, the projecting portion 40 of the retainer 14A and the shaft 42 are removed; the wall portion 51, in which the through hole 53 fitted with the shaft 43 of the projecting portion 41 is bored, is provided in the grip main body 12; and the wall portion 50, which is opposed to the wall portion 51 and disposed in a forward side of the inserting direction such that the space 60 is formed between the wall portion 50 and the projecting portion 41 in the axially supporting condition, is formed. Accordingly, the aforementioned effect, such as the simplification of the assembly, can be obtained.

Also, the damper for obtaining the damping force is not limited to the oil damper, and for example, it can be a damper which generates a damping force by the frictional resistance between the inner shaft and the outer cylinder rotating around the shaft.

Furthermore, the present invention is not limited to the assist grip in the automobile as in the aforementioned embodiment, and for example, the present invention can be applied to a damping structure for a door.

Since the damping structure of the rotating member of the invention and the assist grip including the damping structure of the rotating member are structured as described above, the workability in assembly is improved, and damping effect can be normally carried out. Also, the durability is improved.

While the invention has been explained with reference to the specific embodiments of the invention, the explanation is illustrative and the invention is limited only by the appended claims.

What is claimed is:

1. A damping structure, comprising:
   a base including at least one projecting portion having one of a shaft and a hole, and a first engaging portion,
   a rotating member including a first wall portion having the other of the hole and the shaft engaging said one of the shaft and the hole to be rotationally supported by the at least one projecting portion, a second wall portion facing the first wall portion to receive the at least one projecting portion therebetween so that when the first wall portion is supported by the at least one projecting portion, a space is formed between the at least one projecting portion and the second wall portion, and a second engaging portion,
   a damper disposed in the space to abut against the at least one projecting portion and the second wall portion, and including an inner shaft disposed coaxially with the shaft and the hole and having a third engaging portion engaging one of the first and second engaging portions, and an outer shaft rotatably situated around the inner shaft to generate a damping force against a rotation of the inner shaft, said outer shaft having a fourth engaging portion engaging the other of the first and second engaging portions to thereby provide a damping force to the rotating member, and
   holding means for holding the damper stored in the space formed in the base and being formed of an elastic member integrally formed with the base to be elastically deformable, said elastic member supporting an outer surface of the damper.

2. A damping structure according to claim 1, wherein said third engaging portion formed at the inner shaft engages the first engaging portion formed on the base, and said fourth engaging portion formed at the outer shaft engages the second engaging portion formed on the rotating member.

3. An assist grip provided with the damping structure according to claim 1.

4. An assist grip according to claim 3, wherein said rotating member forms a grip portion, and said base is attached to a portion where the assist grip is to be formed.

5. An assist grip according to claim 4, further comprising a second base attached to the portion where the assist grip is formed, said rotating member further including a supporting portion at a position away from the first and second wall portions and rotationally engaging the second base, and a spring disposed between the second base and the supporting portion for urging the rotating member in one direction.

6. A damping structure, comprising:
   a base including a plurality of projecting portions spaced apart from each other, each projecting portion having one of a shaft and a hole integrally formed therewith, and a first engaging portion,
   a rotating member including a plurality of wall portions spaced apart from each other, each wall portion having the other of the hole and the shaft integrally formed therewith engaging said one of the shaft and the hole to be rotationally supported by the projecting portion, respectively, one of the wall portions facing another of the wall portions to receive one of the projecting portions therebetween so that when the wall portions are supported by the projecting portions, a space is formed between said one of the projecting portions and said another of the wall portions, said shafts formed on the projecting portions or wall portions extending coaxially in a same direction from the projecting portions or wall portions and being arranged to be spaced apart from each other, and a second engaging portion, and a damper disposed in the space to abut against said one of the projecting portions and said another of the wall portions, and including an inner shaft disposed coaxially with the shafts and the holes without being supported by the shafts and having a third engaging portion engaging one of the first and second engaging portions, and an outer shaft rotatably situated around the inner shaft to generate a damping force against a rotation of the inner shaft, said outer shaft having a fourth engaging portion engaging the other of the first and second engaging portions to thereby provide a damping force to the rotating member.

7. A damping structure according to claim 6, wherein said plurality of projecting portions includes first and second projecting portions having the shafts extending in the same direction and spaced apart from each other, and said plurality of wall portions includes first and second wall portions having the holes therein for receiving the shafts so that when the shafts and holes are engaged, the space is formed between the first projecting portion and the second wall portion and the damper is located in the space.

* * * * *